United States Patent
Kawakita

(10) Patent No.: US 12,436,976 B2
(45) Date of Patent: Oct. 7, 2025

(54) INFORMATION ANALYSIS APPARATUS, INFORMATION ANALYSIS METHOD, AND COMPUTER-READABLE RECORDING MEDIUM

(71) Applicant: NEC Corporation, Tokyo (JP)

(72) Inventor: Masaru Kawakita, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/283,097

(22) PCT Filed: Mar. 23, 2021

(86) PCT No.: PCT/JP2021/011985
§ 371 (c)(1),
(2) Date: Sep. 20, 2023

(87) PCT Pub. No.: WO2022/201307
PCT Pub. Date: Sep. 29, 2022

(65) Prior Publication Data
US 2024/0311401 A1 Sep. 19, 2024

(51) Int. Cl.
*G06F 16/33* (2025.01)
*G06F 21/57* (2013.01)

(52) U.S. Cl.
CPC .......... *G06F 16/33* (2019.01); *G06F 21/577* (2013.01)

(58) Field of Classification Search
CPC ............................ G06F 16/33; G06F 21/577
See application file for complete search history.

(56) References Cited

U.S. PATENT DOCUMENTS

| | | | |
|---|---|---|---|
| 2009/0049018 A1* | 2/2009 | Gross | G06F 16/9535 |
| 2009/0254572 A1* | 10/2009 | Redlich | G06Q 10/10 |
| 2012/0047172 A1* | 2/2012 | Ponte | G06F 40/45 |
| | | | 707/E17.022 |
| 2018/0173739 A1* | 6/2018 | Baum | G06F 16/2228 |
| 2023/0040982 A1* | 2/2023 | Inokuchi | G06F 21/577 |

FOREIGN PATENT DOCUMENTS

| | | |
|---|---|---|
| JP | 2008-140313 A | 6/2008 |
| JP | 2010-224622 A | 10/2010 |
| JP | 2011-204106 A | 10/2011 |

OTHER PUBLICATIONS

International Search Report for PCT Application No. PCT/JP2021/011985, mailed on Jun. 22, 2021.
(Continued)

*Primary Examiner* — Tyler J Torgrimson

(57) ABSTRACT

An information analysis apparatus includes: a technical information extracting unit that extracts, from a database storing technical information regarding cyberattacks, technical information related to damage information regarding a cyberattack included in a news article, based on a time of occurrence of damage from a cyberattack; a similarity calculating unit that calculates a similarity between the damage information and the extracted technical information; and an information supplementing unit that specifies technical information corresponding to the damage information based on the calculated similarity, and supplements the news article that includes the damage information with the specified technical information.

15 Claims, 9 Drawing Sheets

(56) References Cited

OTHER PUBLICATIONS

Shunta Nakagawa et al., "Extraction of event information from security reports for modeling threat information", IEICE Technical Report, vol. 118, No. 486, ICSS2018-78, pp. 89-94, Mar. 2019.
English translation of Written opinion for PCT Application No. PCT/JP2021/011985, mailed on Jun. 22, 2021.

* cited by examiner

V1=[[0.  0.  0.38 0.  0.29 0.  0.  0.38 0.48 0.49]
    [0.41 0.41 0.  0.  0.41 0.24 0.41 0.41 0.31 0.  0.  ]]

V2=[[0.  0.  0.48 0.63 0.48 0.  0.37 0.  0.  0.  0.  0.]]

w=[1, 1, 1, 1, 1, 1, 1, 0.2, 1, 1, 1, 0.3]   Weight w for each word

Calculate weighted cosine similarity between documents

Simirarity=(V1, V2, w) = [0.47, 0.09]

Fig.6

News articles

Malware "PlugX" and "Elirks" intruded into Company A and the attack was determined to be an APT attack.

March 1, 2021 19:38  Date and time of damage

Company A announced that it had determined that Company A's secretariat computer was making susp  Victim  unications with the outside.

Company A has concluded that it was an APT (Advanced Persistent Threat) based on the method.

In previous investigations, the computers that had made suspicious communications with the outside world were infected with the malware "PlugX" and "Elirks".  C&C
Malware   Malware Company A clarified that an information leak had occurred in the announcement of the incident.
Exfiltrration Supplemen (CVE ID)

match

Technical
information (IOC)

match

Incicator
└Indicator
  └Type
    └C&C
TTPs
└TTP
  └Behavior
    └Malware
      └Elirks
Exploit_Targets
└Exploit_Target
  └Vulnerability
    └CVE ID
      └CVE-2012-0611

INFORMATION ANALYSIS APPARATUS, INFORMATION ANALYSIS METHOD, AND COMPUTER-READABLE RECORDING MEDIUM

This application is a National Stage Entry of PCT/JP2021/011985 filed on Mar. 23, 2021, the contents of all of which are incorporated herein by reference, in their entirety.

TECHNICAL FIELD

The present invention relates to an information analysis apparatus and an information analysis method for analyzing information regarding a cyberattack, and in particular relates to a computer-readable recording medium in which a program for realizing the information analysis apparatus and the information analysis method is recorded.

BACKGROUND ART

In recent years, systems in government agencies, business enterprises, and the like have been often targeted by cyberattacks, and it has become very important to ensure the security of the systems. Therefore, in system operations, there is a need to collect information regarding vulnerability of the system and, in addition, information regarding cyberattacks such as information regarding the tactics of attacks, and to take necessary measures using such information. In addition, there is a need to invest in the system in order to take measures for ensuring security, and thus information regarding cyberattacks also needs to be collected for business decision-making.

Therefore, information regarding cyberattacks such as victim organization, category of business, timing, and damage content is collected from the latest news articles. Patent Document 1 discloses a system for extracting specific information from the latest news articles. The system disclosed in Patent Document 1 calculates a similarity between feature words extracted from the latest news articles and feature words extracted from existing past news articles, and tags feature words that have a higher similarity out of the former feature words. In the system disclosed in Patent Document 1, feature words related to cyberattacks are tagged, enabling information regarding cyberattacks to be collected.

In addition, Non-patent Document 1 discloses a technique for extracting information regarding cyberattacks (event information) from security reports. Here, the security reports are mainly reports that are provided by security vendors that provide software development and related services for security measures. The security reports can provide, in a structured state, technical information regarding cyberattacks such as the names of software used in attacks, Common Vulnerabilities and Exposures (CVE) IDs, tactics of attacks, and the like, unlike typical news written in natural language.

LIST OF RELATED ART DOCUMENTS

Patent Document

Patent Document 1: Japanese Patent Laid-Open Publication No. 2010-224622

Non Patent Document

Non-patent Document 1: Shunta Nakagawa, Tatsuya Nagai, Hideaki Kanehara, Keisuke Furumoto, Makoto Takita, Yoshiaki Shiraishi, Takeshi Takahashi, Masami Mohri, Yasuhiro Takano, Masakatsu Morii, "Extraction of event information from security reports for modeling threat information", IEICE Technical Report, vol. 118, no. 486, ICSS2018-78, pp. 89-94, March 2019

SUMMARY OF INVENTION

Problems to be Solved by the Invention

However, the system disclosed in Patent Document 1 cannot provide technical information regarding cyberattacks such as tactics of cyberattacks, the IP addresses of servers that carried out cyberattacks, the names of malware, and information for specifying vulnerability. Therefore, when only information provided by the system disclosed in Patent Document 1 is used, it is difficult to take necessary measures against cyberattacks.

On the other hand, with the technique disclosed in Non-patent Document 1, it is impossible to obtain characteristic information regarding cyberattacks such as victims and the cost of damage. Therefore, when only information that is obtained using the technique disclosed in Non-patent Document 1 is used, it is difficult to make the aforementioned business decision.

An example object of the invention is to provide an information analysis apparatus, an information analysis method, and a computer-readable recording medium that can supplement a news article on cyberattacks with information that is lacking.

Means for Solving the Problems

In order to achieve the above-described object, an information analysis apparatus includes:
  a technical information extracting unit that extracts, from a database storing technical information regarding cyberattacks, technical information related to damage information regarding a cyberattack included in a news article, based on a time of occurrence of damage from a cyberattack;
  a similarity calculating unit that calculates a similarity between the damage information and the extracted technical information; and
  an information supplementing unit that specifies technical information corresponding to the damage information based on the calculated similarity, and supplements the news article that includes the damage information with the specified technical information.

In order to achieve the above-described object, an information analysis method includes:
  a technical information extracting step of extracting, from a database storing technical information regarding cyberattacks, technical information related to damage information regarding a cyberattack included in a news article, based on a time of occurrence of damage from a cyberattack;
  a similarity calculating step of calculating a similarity between the damage information and the extracted technical information; and
  an information supplementing step of specifying technical information corresponding to the damage information based on the calculated similarity, and supplementing the news article that includes the damage information, with the specified technical information.

In order to achieve the above-described object, a computer readable recording medium according to an example aspect of the invention is a computer readable recording medium that includes recorded thereon a program, the program including instructions that cause the computer to carry out:

a technical information extracting step of extracting, from a database storing technical information regarding cyberattacks, technical information related to damage information regarding a cyberattack included in a news article, based on a time of occurrence of damage from a cyberattack;

a similarity calculating step of calculating a similarity between the damage information and the extracted technical information; and an information supplementing step of specifying technical information corresponding to the damage information based on the calculated similarity, and supplementing the news article that includes the damage information, with the specified technical information.

Advantageous Effects of the Invention

As described above, according to the invention, it is possible to supplement a news article on cyberattacks with information that is lacking.

BRIEF DESCRIPTION OF THE DRAWINGS

FIG. 6 is a diagram illustrating an example of a news article supplemented with technical information according to the example embodiment.

EXAMPLE EMBODIMENT

Example Embodiment

An information analysis apparatus, an information analysis method, and a program according to an example embodiment will be described below with reference to FIGS. 1 to 9.

[Apparatus Configuration]

Figure 1:
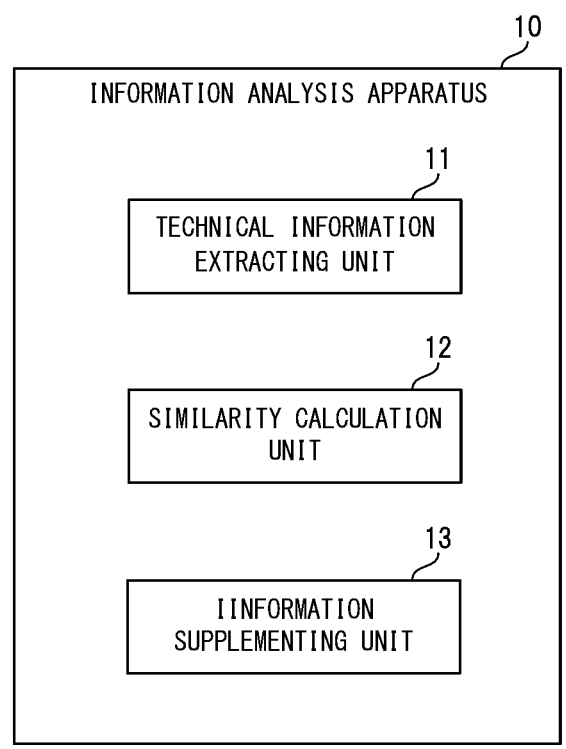
FIG. 1 is a configuration diagram illustrating the schematic configuration of the information analysis apparatus according to the example embodiment.

First, a schematic configuration of the information analysis apparatus according to the example embodiment will be described with reference to FIG. 1. FIG. 1 is a configuration diagram illustrating the schematic configuration of the information analysis apparatus according to the example embodiment.

An information analysis apparatus 10 according to the example embodiment illustrated in FIG. 1 is an apparatus for analyzing information regarding a cyberattack. As illustrated in FIG. 1, the information analysis apparatus 10 includes a technical information extracting unit 11, a similarity calculation unit 12, and an information supplementing unit 13.

The technical information extracting unit 11 extracts, from a database that stores information regarding cyberattacks (hereinafter, referred to as "technical information"), technical information related to damage information regarding a cyberattack included in a news article, based on a time of occurrence of a cyberattack.

The similarity calculation unit 12 calculates the similarity between the damage information and the extracted technical information. The information supplementing unit 13 specifies technical information corresponding to the damage information based on the calculated similarity, and supplements the news article that includes the damage information with the specified technical information.

As described above, in the example embodiment, a news article is supplemented with similar technical information. In other words, in the example embodiment, a news article on a cyberattack is supplemented with information that is lacking.

Figure 2:
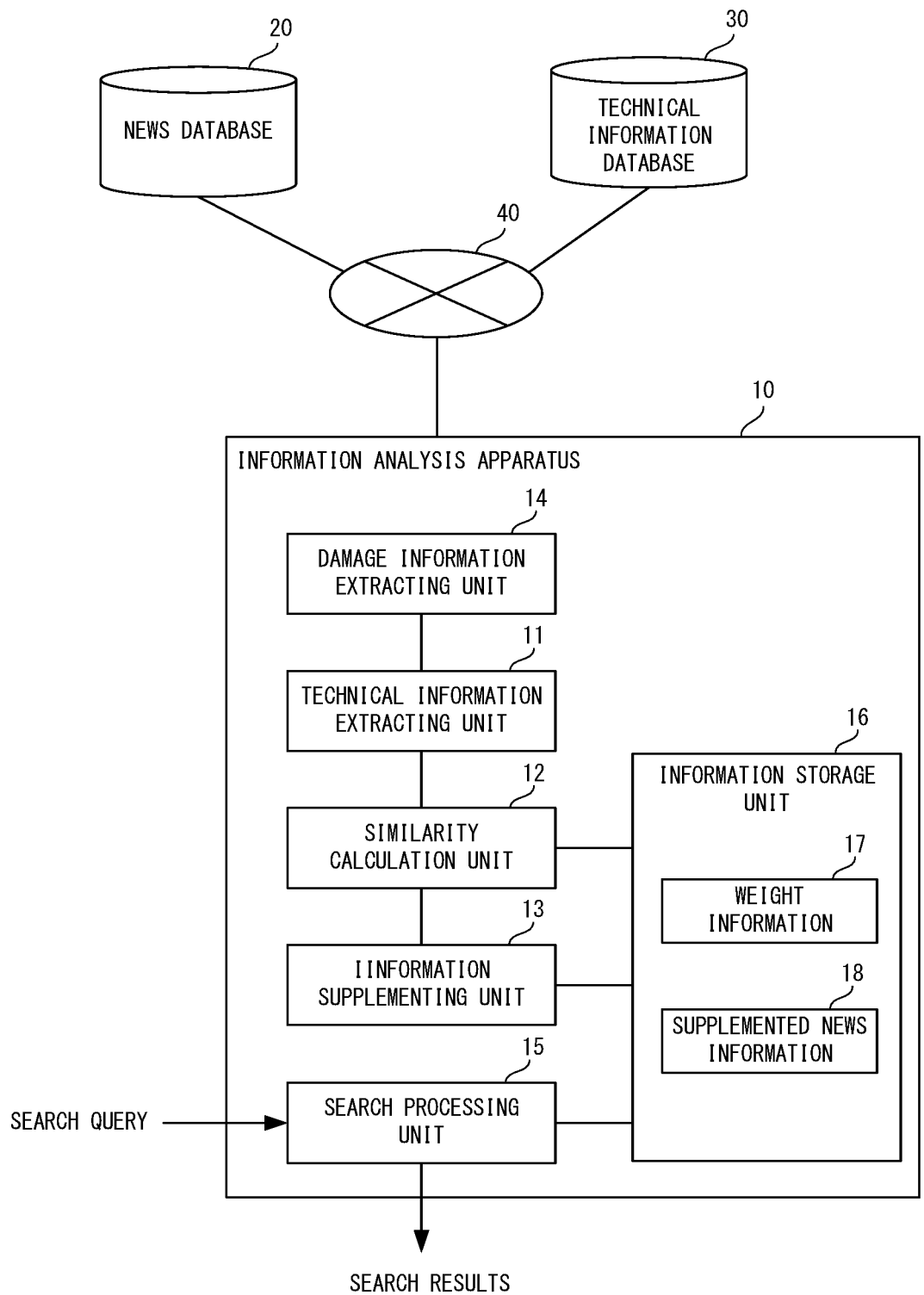
FIG. 2 is a configuration diagram specifically illustrating the configuration of the information analysis apparatus according to the example embodiment.
Figure 3:
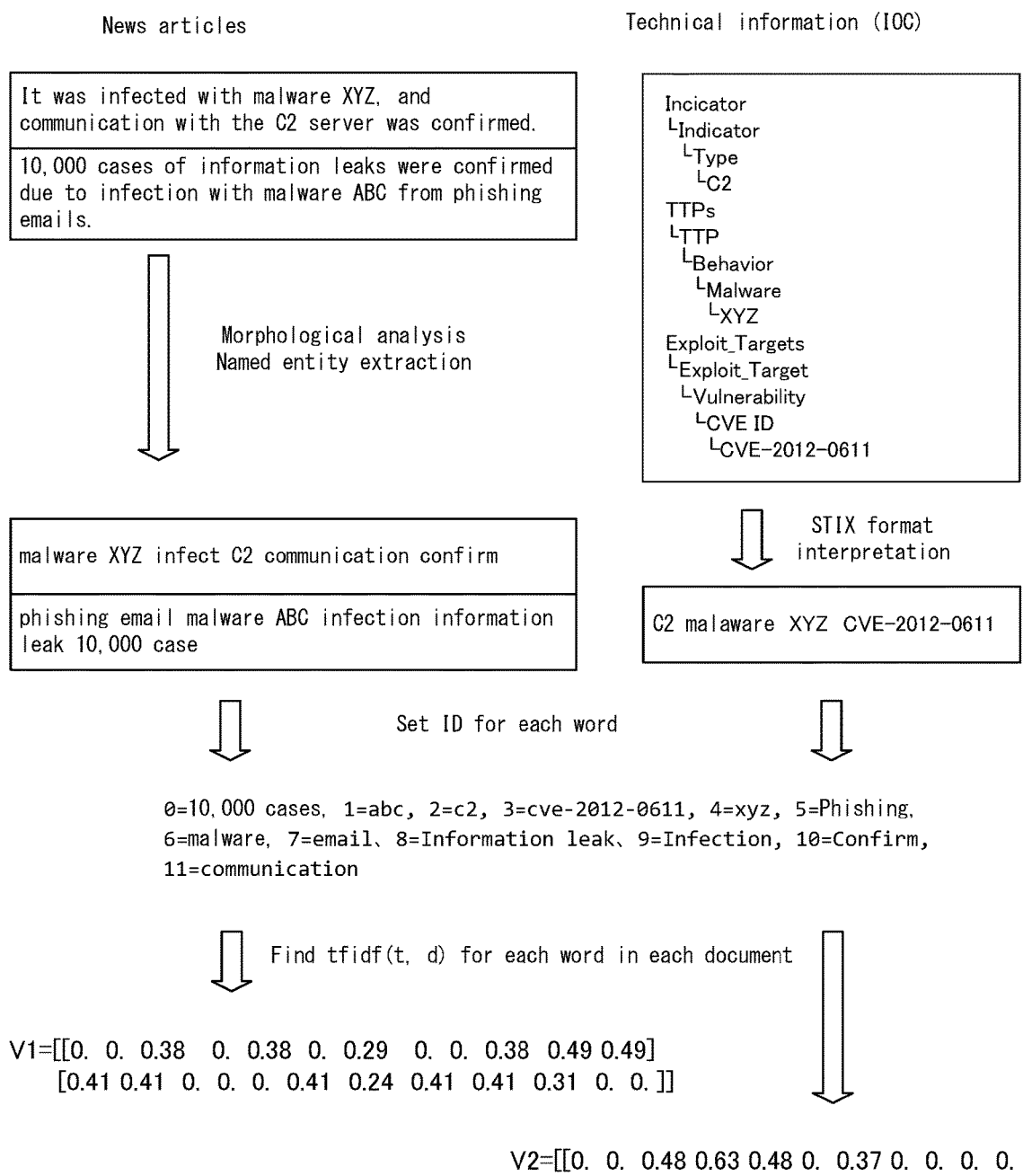
FIG. 3 is a diagram for describing processing for extracting damage information and technical information and preprocessing for calculating a similarity according to the example embodiment.
Figure 4:
FIG. 4 is a diagram for describing similarity calculating processing according to the example embodiment.

Next, the configuration and functions of the information analysis apparatus 10 according to the example embodiment will be described in detail with reference to FIGS. 2 to 4. FIG. 2 is a configuration diagram specifically illustrating the configuration of the information analysis apparatus according to the example embodiment. FIG. 3 is a diagram for describing processing for extracting damage information and technical information and preprocessing for calculating a similarity according to the example embodiment. FIG. 4 is a diagram for describing similarity calculating processing according to the example embodiment.

As illustrated in FIG. 2, in the example embodiment, the information analysis apparatus 10 is connected to a news database 20 and a technical information database 30 via a network 40 such as the Internet, so as to enable data communication.

The news database 20 is a database in which news articles provided on the Internet are stored. The stored news articles are read out by a Web server, and are presented on a Web site. Note that only a single news database 20 is illustrated in the example in FIG. 2, but there are a large number of news databases 20 in actuality.

The technical information database 30 is the aforementioned database in which technical information is stored. In the example embodiment, the technical information is an indicator of compromise (IoC) of a cyberattack, for example. Each IoC includes information regarding the vulnerability of an attacked system (Common Vulnerability and Exposure: CVE), the name of software used in the cyberattack, the tactics of the cyberattack, and the like.

The IoC may be provided from a public organization, a vendor, or the like, or may be generated from the aforementioned security report using an existing tool (for example, Threat Report ATT&CK Mapper: TRAM), or, furthermore, it may be written manually. Furthermore, the IoC may be expressed in STIX (Structured Threat Information expression), or may include a MITRE ATT&CK Technique ID as TTPs (Tactics, Techniques and. Procedures) (see: https://www.ipa.go.jp/security/vuln/STIX.html).

In the STIX format, technical information is expressed in eight information groups, namely cyberattack campaigns, threat actors, TTPs (Tactics, Techniques and Procedures), indicators, observables, incidents, courses of action, and exploit targets. These information groups are associated with each other, and express threat information.

In addition, as illustrated in FIG. 2, the information analysis apparatus 10 includes a damage information extracting unit 14, a search processing unit 15, and an information storage unit 16 in addition to the aforementioned technical information extracting unit 11, similarity calculation unit 12, and information supplementing unit 13.

The damage information extracting unit 14 accesses the news database 20, obtains a stored news article, and extracts damage information regarding damage from a cyberattack, from the obtained news article.

In the example embodiment, damage information includes at least times T of occurrence of damage, victim organizations O, and damage content D1, which are information regarding cyberattack campaigns. Also, the damage information may include information regarding threat actors, techniques and procedures (TTPs), indicators, observables, incidents, courses of action, and exploit targets, in accordance with the STIX format.

Specifically, as illustrated in FIG. 3, the damage information extracting unit 14 extracts, from a news article, words or paragraphs indicating a time T of occurrence of damage, a victim organization O, damage content D1, and the like, as damage information, using a dictionary in which words or paragraphs corresponding to damage information that is to be extracted are registered.

In addition, the damage information extracting unit 14 can also extract, from a news article, words or paragraphs indicating the time T of occurrence of damage, the victim organization O, the damage content D1, and the like, as damage information, using a machine learning model. In this case, the machine learning model is constructed through machine learning using a document in which words or paragraphs are provided with labels indicating whether or not the words or paragraphs are extraction targets, as training data generated in advance.

Furthermore, in the example embodiment, based on a result of diagnosis on vulnerability that is present in a computer system that is to be subjected to information analysis, the damage information extracting unit 14 can specify content of damage that is caused by the vulnerability indicated by the result of the diagnosis. In this case, the damage information extracting unit 14 extracts, from the news article, damage information that includes the specified content of damage. The content of damage that is caused by the vulnerability can be specified by using a preset rule.

In the example embodiment, the technical information extracting unit 11 first accesses the technical information database 30, and obtains stored technical information. The technical information extracting unit 11 then obtains the difference between the time of occurrence of damage included in the obtained technical information and the time T of occurrence of damage included in previously extracted damage information, and extracts technical information in which the obtained difference is within a set range (for example, within two days).

Assume that the technical information database 30 stores IoCs generated in the STIX format as technical information, for example. In this case, as illustrated in FIG. 3, the technical information extracting unit 11 extracts information groups related to damage information, in compliance with the STIX format.

In the example embodiment, for example, the similarity calculation unit 12 calculates a cosine similarity using words included in damage information and words included in technical information corresponding to the damage information, as a similarity. In addition, when there is a plurality of pieces of damage information and/or a plurality of pieces of technical information, the similarity calculation unit 12 sets envisioned combinations of damage information and technical information, and calculates a similarity for each of the combinations.

Specifically, as illustrated in FIG. 3, the similarity calculation unit 12 first specifies words included in the damage information and words included in the extracted technical information, merges overlapping words among the specified words into one, and sets an ID (Identifier) number for each word. Next, the similarity calculation unit 12 calculates tf-idf indicating the degree of importance of each word for which an ID is set, using Expressions 1 to 3 below, for both the damage information and the technical information.

$$tf-idf(t, d) = tf(t, d) \times idf(t) \qquad \text{[Expression 1]}$$

$$tf(t, d) = \text{number of words } t \text{ included in document } d \qquad \text{[Expression 2]}$$

[Expression 3]
$$idf(t) = 1 + \log \frac{1 + \text{total number of documents}}{1 + \text{number of documents that include word } t}$$

Next, for each of the damage information and the technical information, the similarity calculation unit 12 generates a vector in which the number of words for which an ID is set is used as the number of dimensions (12 in the example in FIG. 3) and calculated tf-idf values of the words are included as elements. In the example in FIG. 3, there are two pieces of damage information and one piece of technical information, and thus two vectors V1 of damage information and one vector V2 of technical information, namely three vectors in total are generated.

The similarity calculation unit 12 then obtains a weight $w_i$ from a preset weight of each word, and, as illustrated in FIG. 4, applies the weight w to the vectors V1 of the damage information and the vector V2 of the technical information, and calculates the similarity therebetween. Specifically, the similarity is calculated using Expression 4 below. In Expression 4, the similarity is expressed as a similarity (a,b,w). In addition, a and b in Expression 4 indicate elements in a vector of a document that is targeted for similarity calculation, and $w_i$ indicates a weight of each word. In addition, in FIG. 4, two vectors are generated as the vectors V1, and thus two values are calculated as similarities.

$$\text{similarity}(a, b, w) = \frac{\sum_{i=1}^{n} w_i^2 a_i b_i}{\sqrt{\sum_{i=1}^{n} w_i^2 a_i^2} \sqrt{\sum_{i=1}^{n} w_i^2 b_i^2}} \qquad \text{[Expression 4]}$$

In addition, in the example embodiment, as illustrated in FIG. 2, the weight $w_i$ for each word is stored in the information storage unit 16 as weight information 17. A value manually set in advance may be used as the weight $w_i$, but an output value of a neural network may also be used. In this case, the neural network is trained through machine learning by inputting the vectors of two documents that are used as training data, and updating the parameters of the neural network such that an output value at this time is an appropriate weight w.

In addition, the similarity calculation unit 12 can also input words included in damage information and words included in technical information corresponding to the damage information, to a learning model trained through machine learning on the similarity relation between words indicating damage from cyberattacks and words included in technical information, and calculate a similarity based on an output result from the learning model. The learning model in this case is constructed through machine learning using training data obtained by providing a similarity that is correct data, to combinations of word groups indicating damage from cyberattacks and word groups included in technical information.

In the example embodiment, the information supplementing unit 13 specifies technical information that has the highest similarity, for each piece of damage information, and supplements the news article that includes the damage information (in other words, from which the damage information was extracted) with the specified technical information. Specifically, the information supplementing unit 13 compares the specified technical information with the damage information, and further specifies information that is lacking in the damage information, out of the specified technical information. When the information that is lacking is a CVE ID that is information regarding vulnerability of the attacked system, for example, the information supplementing unit 13 supplements the news article with a CVE ID.

In addition, the information supplementing unit 13 stores the news article supplemented with the technical information, as supplemented news information 18, in the information storage unit 16.

The search processing unit 15 accepts a search query input via an input apparatus such as a keyboard or an external terminal apparatus, and executes a search for the supplemented news information 18 stored in the information storage unit 16, based on the accepted search query.

Specifically, the search processing unit 15 specifies a news article that includes damage information that matches or is similar to the search query, from the supplemented news information stored in the information storage unit 16. The search processing unit 15 then displays the specified news article on the screen of an external display device, the screen of a terminal apparatus, or the like, as a search result, in a state where the news article is supplemented with the technical information.

[Apparatus Operations]

Figure 5:
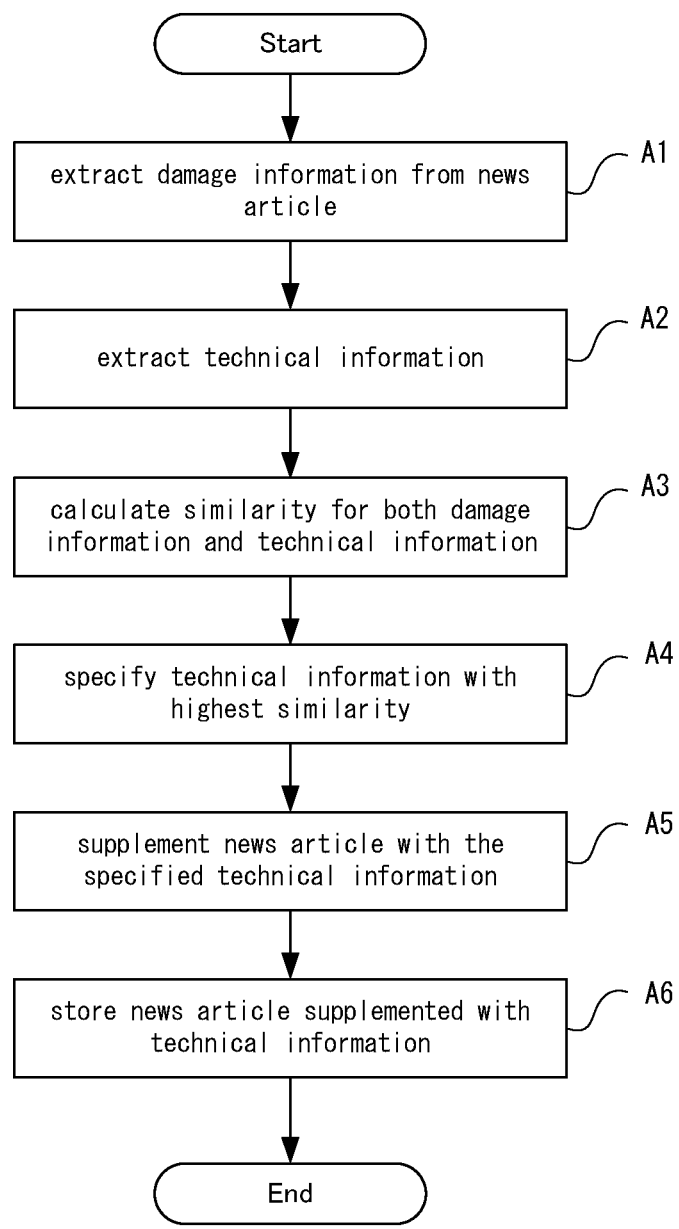
FIG. 5 is a flowchart illustrating operations of the information analysis apparatus according to the example embodiment.

Next, operations of the information analysis apparatus 10 in the example embodiment will be described with reference to FIG. 5. FIG. 5 is a flowchart illustrating operations of the information analysis apparatus according to the example embodiment. In the following description, FIGS. 1 to 4 are referred to as appropriate. In addition, in the example embodiment, an information analysis method is performed by operating the information analysis apparatus 10. Thus, description of the information analysis method in the example embodiment is replaced with the following description of the operations of the information analysis apparatus 10.

As illustrated in FIG. 5, first, the damage information extracting unit 14 accesses the news database 20, obtains a stored news article, and extracts, from the obtained news article, damage information regarding damage from a cyberattack (step A1).

Next, the technical information extracting unit 11 extracts, from the technical information database 30 that stores technical information, technical information related to the damage information regarding a cyberattack included in the news article, based on a time of occurrence of damage from a cyberattack (step A2).

Specifically, in step A2, the technical information extracting unit 11 obtains the difference between a time of occurrence of damage included in the obtained technical information and times T of occurrence of damage included in previously extracted damage information, and extracts technical information in which the obtained difference is within a set range (for example, within two days).

Next, the similarity calculation unit 12 first sets envisioned combinations of damage information and technical information. The similarity calculation unit 12 then calculates tf-idf values of respective words and generates a vector for each combination, for both damage information and technical information, applies the generated vector and the weight information 17 to Expression 4 above, and calculates the similarity therebetween (step A3).

Next, the information supplementing unit 13 specifies technical information that has the highest similarity, for each piece of damage information (step A4).

Next, the information supplementing unit 13 compares the technical information specified in step A4 with the damage information, further specifies information that is lacking in the damage information, from the specified technical information, and supplements the news article from which the damage information was extracted, with the information that is lacking (step A5).

The information supplementing unit 13 then stores the news article supplemented with the technical information in step A5, as the supplemented news information 18 in the information storage unit 16 (step A6).

After step A6 is completed, when a search query is input via an input apparatus such as a keyboard or an external terminal apparatus, the search processing unit 15 accepts the search query. The search processing unit 15 then specifies a news article that includes damage information that matches or is similar to the search query, from the supplemented news information 18 stored in the information storage unit 16. The specified news article was supplemented with technical information. The search processing unit 15 then displays, as a search result, the news article supplemented with the technical information, on the screen of an external display device, the screen of a terminal apparatus, or the like.

Here, a specific example of a news article supplemented with technical information will be described with reference to FIG. 6. FIG. 6 is a diagram illustrating an example of a news article supplemented with technical information according to the example embodiment. In the example in FIG. 6, a portion of the news article enclosed by frame lines is damage information. In addition, the damage information in the news article is provided with labels indicating corresponding attributes. The technical information shown under the news article illustrated in FIG. 6 is technical information that is to be used for supplementation. Only a "CVE" ID that is information regarding vulnerability in the technical information is lacking in the damage information. Therefore, in the example in FIG. 6, the information supplementing unit 13 supplements the news article with "CVE-2012-0611".

As described above, in the example embodiment, a news article on a cyberattack is supplemented with technical information that is lacking. Therefore, technical information regarding a cyberattack cannot be obtained from only an ordinary news article, and thus the administrator of the system cannot understand how the cyberattack occurred, but, according to the example embodiment, such an understanding is possible.

Modified Example 1

Figure 7:
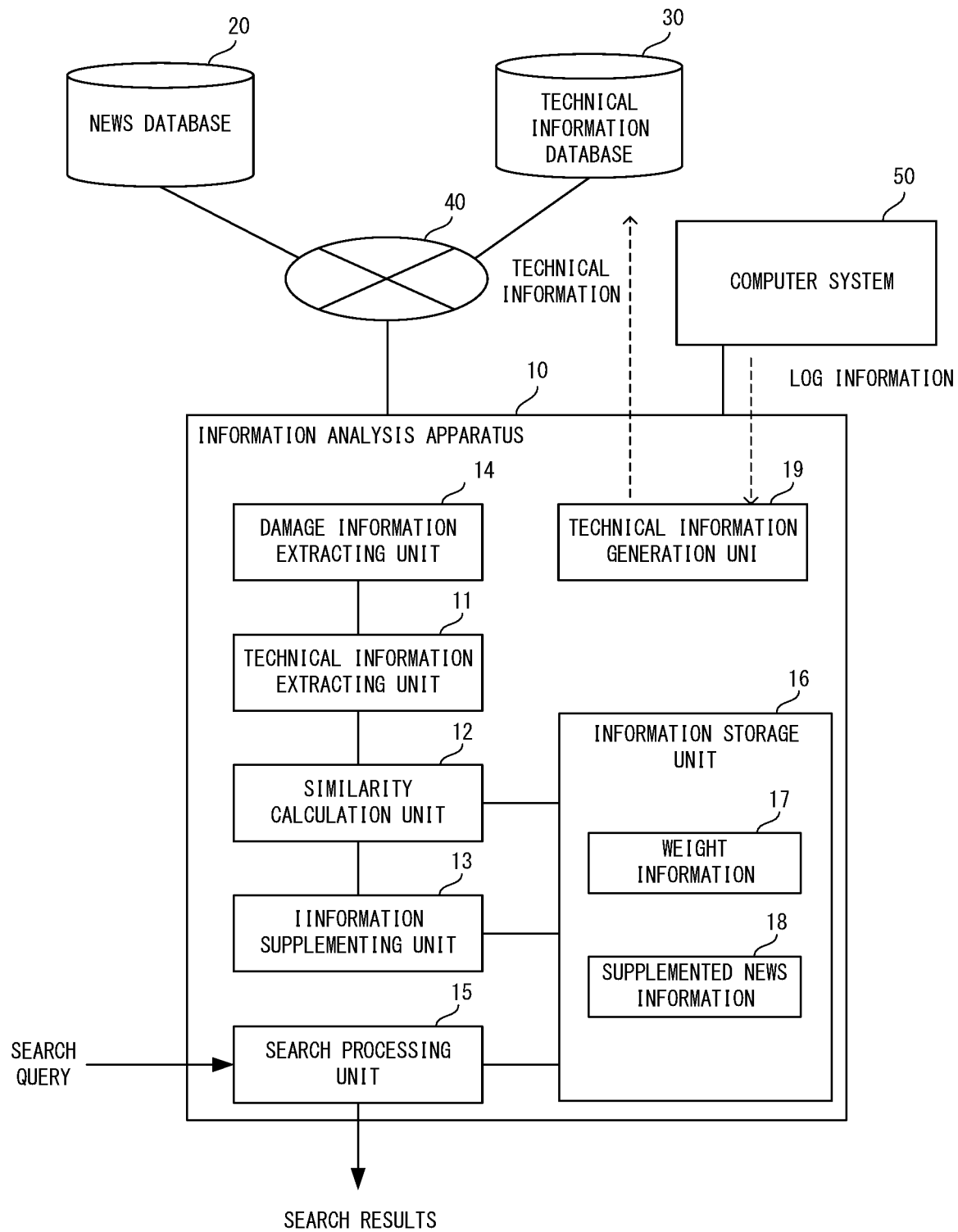
FIG. 7 is a configuration diagram illustrating a configuration of Modified Example 1 of the information analysis apparatus according to the example embodiment.

Next, Modified Example 1 of the information analysis apparatus according to the example embodiment will be described with reference to FIG. 7. FIG. 7 is a configuration diagram illustrating a configuration of Modified Example 1 of the information analysis apparatus according to the example embodiment.

As illustrated in FIG. 7, the information analysis apparatus 10 according to Modified Example 1, unlike the example illustrated in FIG. 2, includes a technical information generation unit 19, in addition to the technical information extracting unit 11, the similarity calculation unit 12, the information supplementing unit 13, the damage information extracting unit 14, the search processing unit 15, and the information storage unit 16. In addition, the information analysis apparatus 10 is connected to a computer system 50 that is an analysis target in a manner that enables data communication.

The technical information generation unit 19 obtains log information generated by the computer system 50, and generates technical information from the obtained log information. In addition, the technical information generation unit 19 newly stores the generated technical information in the technical information database 30.

As described above, in Modified Example 1, it is possible to create new technical information from an event that has newly occurred in the computer system, and update the information stored in the technical information database 30. Therefore, according to Modified Example 1, a news article can be more appropriately supplemented. Note that the newly generated technical information may be a database different from the technical information database 30.

Modified Example 2

Figure 8:
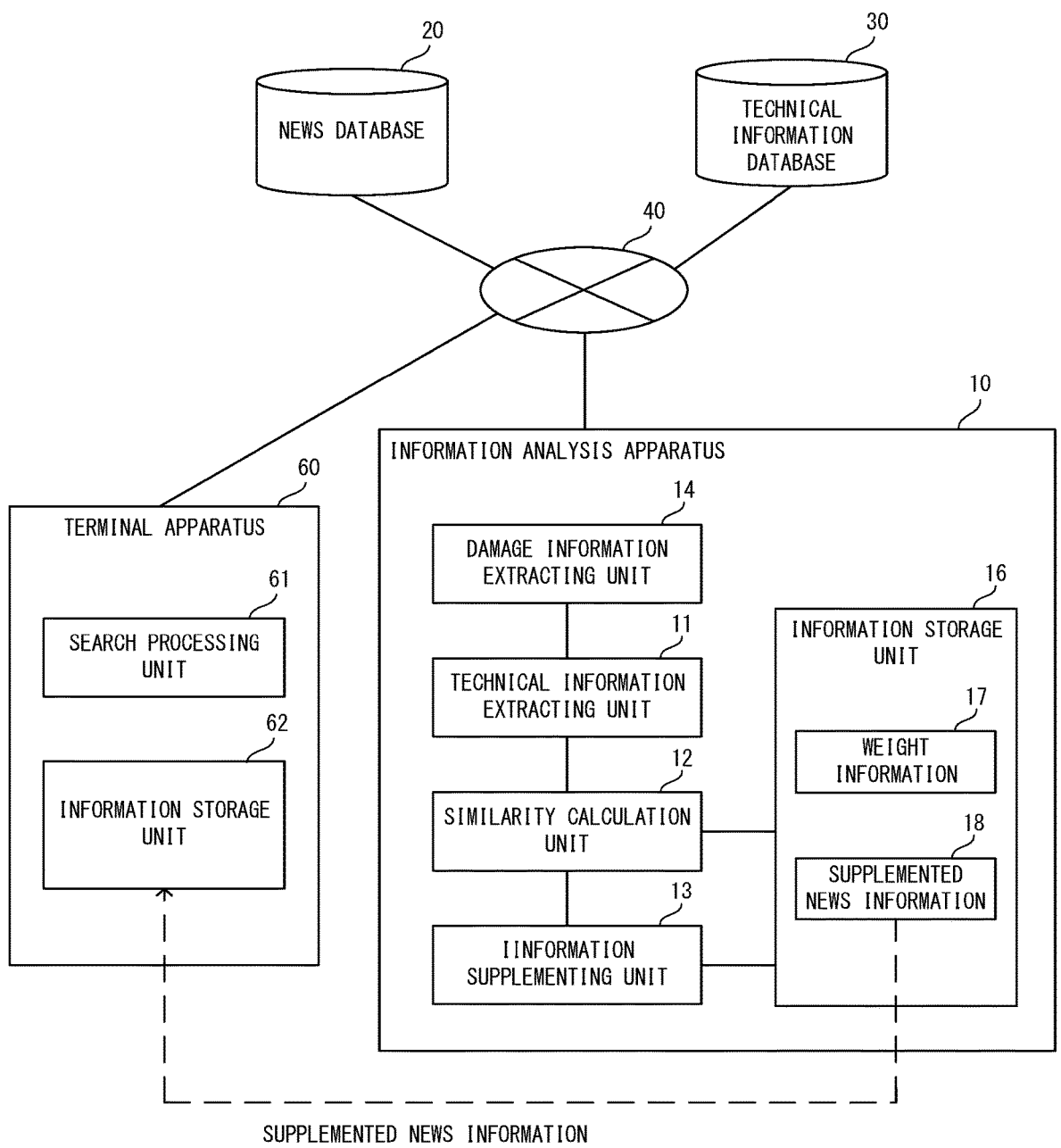
FIG. 8 is a configuration diagram illustrating a configuration of Modified Example 2 of the information analysis apparatus according to the example embodiment.

Modified Example 2 of the information analysis apparatus 10 according to the example embodiment will be described with reference to FIG. 8. FIG. 8 is a configuration diagram illustrating a configuration of Modified Example 2 of the information analysis apparatus according to the example embodiment.

As illustrated in FIG. 8, in Modified Example 2, unlike the example illustrated in FIG. 2, a configuration is adopted in which the information analysis apparatus 10 does not include a search processing unit. In all other respects, the information analysis apparatus 10 is similar to the example illustrated in FIG. 2.

In Modified Example 2, the information analysis apparatus 10 is connected to a terminal apparatus 60 that is used by a searcher, via the network 40. In addition, the terminal apparatus 60 includes a search processing unit 61 that is similar to the search processing unit 15 illustrated in FIG. 2, and an information storage unit 62.

In addition, in Modified Example 2, when a news article is supplemented with technical information, the information analysis apparatus 10 transmits the supplemented news article 18 to the terminal apparatus 60 via the network 40. When the supplemented news article 18 is transmitted, the terminal apparatus 60 stores the supplemented news article 18 in the information storage unit 62.

With this configuration, a searcher can input a search query on the terminal apparatus 60. In this case, the search processing unit 61 accesses the information storage unit 62 of the terminal apparatus 60, and specifies a news article that matches or is similar to the search query, from supplemented news articles 18 stored in the information storage unit 62. The search processing unit 61 then displays the specified news article on the screen of the terminal apparatus 60.

According to Modified Example 2, the information analysis apparatus 10 itself does not need to have a search function, and the cost of the information analysis apparatus 10 is decreased. In addition, no search query is transmitted from the terminal apparatus 60 to the information analysis apparatus 10, and thus, according to a modified example, the likelihood of a search query becoming known to the administrator of the information analysis apparatus 10 is eliminated.

[Program]

It suffices for the program according to the example embodiment that causes a computer to carry out steps A1 to A6 illustrated in FIG. 5. By installing this program on a computer and executing the program, the information analysis apparatus 10 and the information analysis method in the example embodiment can be realized. In this case, one or more processors of the computer function and perform processing as the technical information extracting unit 11, similarity calculation unit 12, information supplementing unit 13, and the damage information extracting unit 14. Furthermore, besides a general-purpose PC, a smartphone and a tablet-type terminal device can be mentioned as examples of the computer.

Furthermore, in the example embodiment, the information storage unit 16 may be realized by storing data files constituting the information storage unit 16 in a storage device such as a hard disk provided in the computer, or may be realized by a storage device provided in another computer.

The program according to the example embodiment may be executed by a computer system constructed from a plurality of computers. In this case, the computers may each function as one of the technical information extracting unit 11, similarity calculation unit 12, information supplementing unit 13, and the damage information extracting unit 14.

[Physical Configuration]

Figure 9:
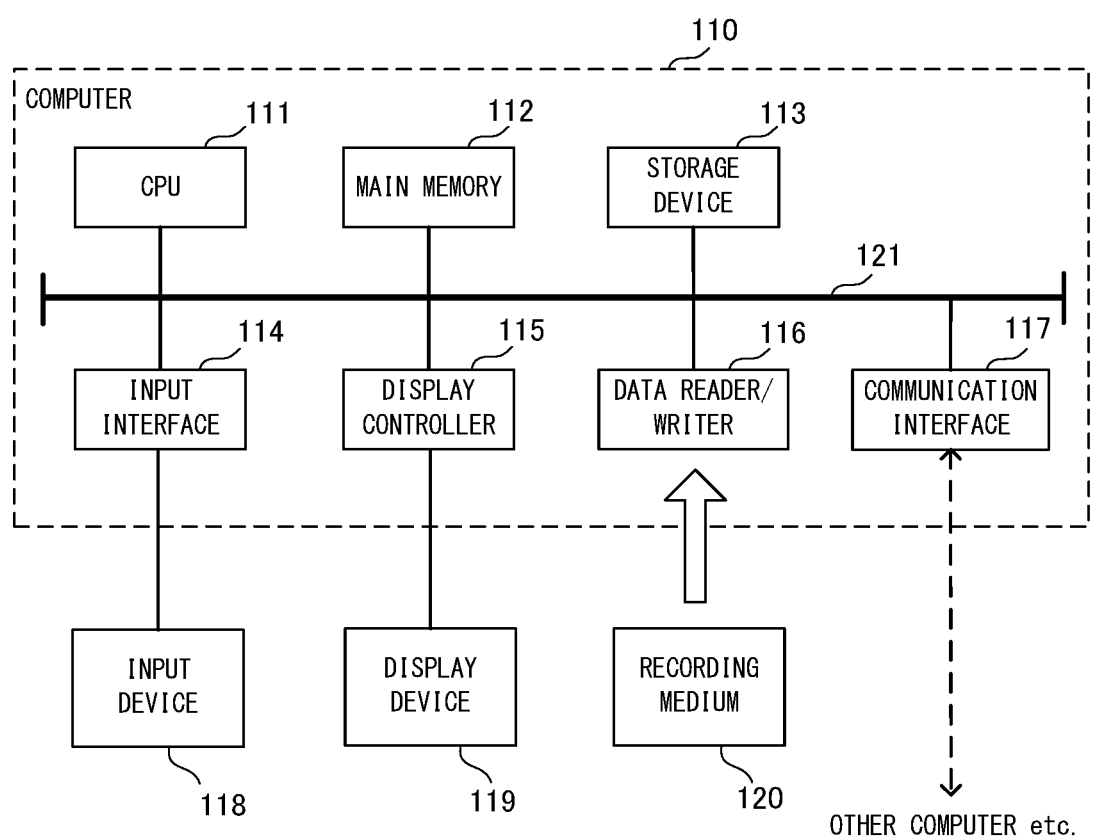
FIG. 9 is a block diagram illustrating an example of a computer that realizes the information analysis apparatus according to the example embodiment.

Using FIG. 9, the following describes a computer that realizes the information analysis apparatus 10 by executing the program according to the example embodiment. FIG. 9 is a block diagram illustrating an example of a computer that realizes the information analysis apparatus according to the example embodiment.

As illustrated in FIG. 9, a computer 110 includes a CPU (Central Processing Unit) 111, a main memory 112, a storage device 113, an input interface 114, a display controller 115, a data reader/writer 116, and a communication interface 117. These components are connected in such a manner that they can perform data communication with one another via a bus 121.

The computer 110 may include a GPU (Graphics Processing Unit) or an FPGA (Field-Programmable Gate Array) in addition to the CPU 111, or in place of the CPU 111. In this case, the GPU or the FPGA can execute the program according to the example embodiment.

The CPU 111 deploys the program according to the example embodiment, which is composed of a code group stored in the storage device 113 to the main memory 112, and carries out various types of calculation by executing the codes in a predetermined order. The main memory 112 is typically a volatile storage device, such as a DRAM (dynamic random-access memory).

Also, the program according to the example embodiment is provided in a state where it is stored in a computer-readable recording medium 120. Note that the program according to the example embodiment may be distributed over the Internet connected via the communication interface 117.

Also, specific examples of the storage device 113 include a hard disk drive and a semiconductor storage device, such as a flash memory. The input interface 114 mediates data transmission between the CPU 111 and an input device 118, such as a keyboard and a mouse. The display controller 115 is connected to a display device 119, and controls display on the display device 119.

The data reader/writer 116 mediates data transmission between the CPU 111 and the recording medium 120, reads out the program from the recording medium 120, and writes the result of processing in the computer 110 to the recording medium 120. The communication interface 117 mediates data transmission between the CPU 111 and another computer.

Specific examples of the recording medium 120 include: a general-purpose semiconductor storage device, such as CF (CompactFlash®) and SD (Secure Digital); a magnetic recording medium, such as a flexible disk; and an optical recording medium, such as a CD-ROM (Compact Disk Read Only Memory).

Note that the information analysis apparatus 10 can also be realized by using items of hardware that respectively correspond to the components rather than the computer in which the program is installed. Furthermore, a part of the information analysis apparatus 10 may be realized by the program, and the remaining part of the information analysis apparatus 10 may be realized by hardware.

A part or an entirety of the above-described example embodiment can be represented by (Supplementary Note 1) to (Supplementary Note 18) described below but is not limited to the description below.

Supplementary Note 1

An information analysis apparatus comprising:
a technical information extracting unit that extracts, from a database storing technical information regarding cyberattacks, technical information related to damage information regarding a cyberattack included in a news article, based on a time of occurrence of damage from a cyberattack;
a similarity calculating unit that calculates a similarity between the damage information and the extracted technical information; and
an information supplementing unit that specifies technical information corresponding to the damage information based on the calculated similarity, and supplements the news article that includes the damage information with the specified technical information.

Supplementary Note 2

The information analysis apparatus according to Supplementary Note 1,
wherein the damage information includes at least the time of occurrence of damage, a victim organization, and content of the damage, and
the technical information extracting unit obtains a difference between a time of occurrence of damage included in the technical information and the time of occurrence of damage included in the damage information, and extracts technical information for which the obtained difference is within a set range.

Supplementary Note 3

The information analysis apparatus according to Supplementary Note 1 or 2,
wherein the similarity calculating unit calculates, as the similarity, a cosine similarity using a word included in the damage information and a word included in the technical information corresponding to the damage information.

Supplementary Note 4

The information analysis apparatus according to Supplementary Note 1 or 2,
wherein the similarity calculating unit inputs the word included in the damage information and the word included in the technical information corresponding to the damage information, to a learning model trained through machine learning on a similarity relation between a word indicating damage from a cyberattack and a word included in technical information, and calculates the similarity based on an output result from the learning model.

Supplementary Note 5

The information analysis apparatus according to any one of Supplementary Notes 1 to 4, further comprising:
a technical information generating unit for generating technical information from log information generated by a computer system, and storing the generated technical information in the database.

Supplementary Note 6

The information analysis apparatus according to any one of Supplementary Notes 1 to 5, further comprising:
a damage information extracting unit for extracting damage information regarding damage from a cyberattack, from a news article,
wherein the damage information extracting unit specifies, based on a result of diagnosis on vulnerability that is present in a computer system, content of damage that is caused by the vulnerability indicated by the result of diagnosis, and extracts damage information that includes the specified content of damage, from the news article.

Supplementary Note 7

An information analysis method comprising:
a technical information extracting step of extracting, from a database storing technical information regarding cyberattacks, technical information related to damage information regarding a cyberattack included in a news article, based on a time of occurrence of damage from a cyberattack;
a similarity calculating step of calculating a similarity between the damage information and the extracted technical information; and
an information supplementing step of specifying technical information corresponding to the damage information based on the calculated similarity, and supplementing the news article that includes the damage information, with the specified technical information.

Supplementary Note 8

The information analysis method according to Supplementary Note 7,
wherein the damage information includes at least the time of occurrence of damage, a victim organization, and content of the damage, and
in the technical information extracting step, a difference between a time of occurrence of damage included in the technical information and the time of occurrence of damage included in the damage information is obtained, and technical information for which the obtained difference is within a set range is extracted.

Supplementary Note 9

The information analysis method according to Supplementary Note 7 or 8,
wherein, in the similarity calculating step, a cosine similarity is calculated as the similarity using a word included in the damage information and a word included in the technical information corresponding to the damage information.

Supplementary Note 10

The information analysis method according to Supplementary Note 7 or 8,
wherein, in the similarity calculating step, the word included in the damage information and the word included in the technical information corresponding to the damage information are input to a learning model trained through machine learning on similarity relation between a word indicating damage from a cyberattack and a word included in technical information, and the similarity is calculated based on an output result from the learning model.

Supplementary Note 11

The information analysis method according to any one of Supplementary Notes 7 to 10, further comprising:
a technical information generating step of generating technical information from log information generated by a computer system, and storing the generated technical information in the database.

Supplementary Note 12

The information analysis method according to any one of Supplementary Notes 7 to 11, further comprising:
a damage information extracting step of extracting damage information regarding damage from a cyberattack, from a news article,
wherein, in the damage information extracting step, based on a result of diagnosis on vulnerability that is present in a computer system, content of damage that is caused by the vulnerability indicated by the result of diagnosis is specified, and damage information that includes the specified content of damage is extracted from the news article.

Supplementary Note 13

A computer-readable recording medium that includes a program recorded thereon, the program including instructions that cause a computer to carry out:

a technical information extracting step of extracting, from a database storing technical information regarding cyberattacks, technical information related to damage information regarding a cyberattack included in a news article, based on a time of occurrence of damage from a cyberattack;
a similarity calculating step of calculating a similarity between the damage information and the extracted technical information; and
an information supplementing step of specifying technical information corresponding to the damage information based on the calculated similarity, and supplementing the news article that includes the damage information, with the specified technical information.

Supplementary Note 14

The computer-readable recording medium according to Supplementary Note 13,
wherein the damage information includes at least the time of occurrence of damage, a victim organization, and content of the damage, and
in the technical information extracting step, a difference between a time of occurrence of damage included in the technical information and the time of occurrence of damage included in the damage information is obtained, and technical information for which the obtained difference is within a set range is extracted.

Supplementary Note 15

The computer-readable recording medium according to Supplementary Note 13 or 14,
wherein, in the similarity calculating step, a cosine similarity is calculated as the similarity using a word included in the damage information and a word included in the technical information corresponding to the damage information.

Supplementary Note 16

The computer-readable recording medium according to Supplementary Note 13 or 14,
wherein, in the similarity calculating step, the word included in the damage information and the word included in the technical information corresponding to the damage information are input to a learning model trained through machine learning on similarity relation between a word indicating damage from a cyberattack and a word included in technical information, and the similarity is calculated based on an output result from the learning model.

Supplementary Note 17

The computer-readable recording medium according to any one of Supplementary Notes 13 to 16, the program further including instructions that cause the computer to carry out:
a technical information generating step of generate technical information from log information generated by a computer system, and store the generated technical information in the database.

Supplementary Note 18

The computer-readable recording medium according to any one of Supplementary Notes 13 to 17, the program further including instructions that cause the computer to carry out:

a damage information extracting step of extract damage information regarding damage from a cyberattack, from a news article, wherein, in the damage information extracting step, based on a result of diagnosis on vulnerability that is present in a computer system, content of damage that is caused by the vulnerability indicated by the result of diagnosis is specified, and damage information that includes the specified content of damage is extracted from the news article.

Although the invention of the present application has been described above with reference to the example embodiment, the invention of the present application is not limited to the above-described example embodiment. Various changes that can be understood by a person skilled in the art within the scope of the invention of the present application can be made to the configuration and the details of the invention of the present application.

INDUSTRIAL APPLICABILITY

According to the invention, it is possible to supplement a news article on cyberattacks with information that is lacking. The present invention is useful in various fields where analysis of cyberattacks is required.

REFERENCE SIGNS LIST

10 Information analysis apparatus
11 Technical information extracting unit
12 Similarity calculation unit
13 Information supplementing unit
14 Damage information extracting unit
15 Search processing unit
16 Information storage unit
17 Weight information
18 Supplemented news information
19 Technical information generation unit
20 News database
30 Technical information database
40 Network
50 Computer system
60 Terminal apparatus
61 Search processing unit
62 Information storage unit
110 Computer
111 CPU
112 Main memory
113 Storage device
114 Input interface
115 Display controller
116 Data reader/writer
117 Communication interface
118 Input device
119 Display device
120 Recording medium
121 Bus

What is claimed is:

1. An information analysis apparatus comprising:
at least one memory storing instructions; and
at least one processor configured to execute the instructions to:
extract, from a database storing technical information regarding cyberattacks, technical information related to damage information regarding a cyberattack included in a news article, based on a time of occurrence of damage from a cyberattack;
calculate a similarity between the damage information and the extracted technical information;
specify technical information corresponding to the damage information based on the calculated similarity;
supplement the news article that includes the damage information with the specified technical information, wherein
the information analysis apparatus is connected to a technical information database so as to enable data communication, and
the technical information database stores trace information, including information on vulnerabilities of an attacked system, a name of software used in a cyberattack, and tactics of a cyberattack;
generate technical information from log information generated by a computer system;
store the generated technical information in the technical information database;
update the technical information database;
display a user interface in which
the news article is supplemented with the technical information,
a portion of the news article enclosed by frame lines is the damage information, and
the damage information in the news article is provided with labels indicating corresponding attributes; and
transmit the supplemented news article to a terminal apparatus via a network to cause the terminal apparatus to store the supplemented news article,
wherein a searcher inputs a search query on the terminal apparatus, such that the terminal specifies the supplemented news article that matches the search query, and displays the specified news article on a screen of the terminal apparatus.

2. The information analysis apparatus according to claim 1,
wherein the damage information includes at least the time of occurrence of damage, a victim organization, and content of the damage, and
wherein the at least one processor is configured to execute the instructions to further:
obtain a difference between a time of occurrence of damage included in the technical information and the time of occurrence of damage included in the damage information, and extract technical information for which the obtained difference is within a set range.

3. The information analysis apparatus according to claim 1,
wherein the at least one processor is configured to execute the instructions to further:
calculate, as the similarity, a cosine similarity using a word included in the damage information and a word included in the technical information corresponding to the damage information.

4. The information analysis apparatus according to claim 1,
wherein the at least one processor is configured to execute the instructions to further:
input a word included in the damage information and a word included in the technical information corresponding to the damage information, to a learning model trained through machine learning on a similarity relation between a word indicating damage from a cyberattack and the word included in technical information, and calculate the similarity based on an output result from the learning model.

5. The information analysis apparatus according to claim 1,
wherein the at least one processor is configured to execute the instructions to further:
extract damage information regarding damage from a cyberattack, from a news article,
specify, based on a result of diagnosis on a vulnerability that is present in a computer system, content of damage that is caused by a vulnerability indicated by the result of diagnosis, and extract damage information that includes the specified content of damage, from the news article.

6. An information analysis method performed by an information analysis apparatus and comprising:
extracting, from a database storing technical information regarding cyberattacks, technical information related to damage information regarding a cyberattack included in a news article, based on a time of occurrence of damage from a cyberattack;
calculating a similarity between the damage information and the extracted technical information;
specifying technical information corresponding to the damage information based on the calculated similarity;
supplementing the news article that includes the damage information, with the specified technical information, wherein
the information analysis apparatus is connected to a technical information database so as to enable data communication, and
the technical information database stores trace information, including information on vulnerabilities of an attacked system, a name of software used in a cyberattack, and tactics of a cyberattack;
generating technical information from log information generated by a computer system;
storing the generated technical information in the technical information database;
updating the technical information database;
displaying a user interface in which
the news article is supplemented with the technical information,
a portion of the news article enclosed by frame lines is the damage information, and
the damage information in the news article is provided with labels indicating corresponding attributes; and
transmitting the supplemented news article to a terminal apparatus via a network to cause the terminal apparatus to store the supplemented news article,
wherein a searcher inputs a search query on the terminal apparatus, such that the terminal specifies the supplemented news article that matches the search query, and displays the specified news article on a screen of the terminal apparatus.

7. The information analysis method according to claim 6,
wherein the damage information includes at least the time of occurrence of damage, a victim organization, and content of the damage, and
in the extraction of the technical information, a difference between a time of occurrence of damage included in the technical information and the time of occurrence of damage included in the damage information is obtained, and technical information for which the obtained difference is within a set range is extracted.

8. The information analysis method according to claim 6, wherein, in the calculation of the similarity, a cosine similarity is calculated as the similarity using a word included in the damage information and a word included in the technical information corresponding to the damage information.

9. The information analysis method according to claim 6, wherein, in the calculation of the similarity, a word included in the damage information and a word included in the technical information corresponding to the damage information are input to a learning model trained through machine learning on similarity relation between a word indicating damage from a cyberattack and the word included in technical information, and the similarity is calculated based on an output result from the learning model.

10. The information analysis method according to claim 6, further comprising:
extracting damage information regarding damage from a cyberattack, from a news article,
wherein, in the extraction of the damage information, based on a result of diagnosis on a vulnerability that is present in a computer system, content of damage that is caused by a vulnerability indicated by the result of diagnosis is specified, and damage information that includes the specified content of damage is extracted from the news article.

11. A non-transitory computer-readable recording medium storing a program executable by an information analysis apparatus to perform processing comprising:
extracting, from a database storing technical information regarding cyberattacks, technical information related to damage information regarding a cyberattack included in a news article, based on a time of occurrence of damage from a cyberattack;
calculating a similarity between the damage information and the extracted technical information; and
specifying technical information corresponding to the damage information based on the calculated similarity;
supplementing the news article that includes the damage information, with the specified technical information, wherein
the information analysis apparatus is connected to a technical information database so as to enable data communication, and
the technical information database stores trace information, including information on vulnerabilities of an attacked system, a name of software used in a cyberattack, and tactics of a cyberattack;
generating technical information from log information generated by a computer system;
storing the generated technical information in the technical information database; and
updating the technical information database;
displaying a user interface in which
the news article is supplemented with the technical information,
a portion of the news article enclosed by frame lines is the damage information, and
the damage information in the news article is provided with labels indicating corresponding attributes; and
transmitting the supplemented news article to a terminal apparatus via a network to cause the terminal apparatus to store the supplemented news article,
wherein a searcher inputs a search query on the terminal apparatus, such that the terminal specifies the supplemented news article that matches the search query and displays the specified news article on a screen of the terminal apparatus.

12. The non-transitory computer-readable recording medium according to claim 11,
wherein the damage information includes at least the time of occurrence of damage, a victim organization, and content of the damage, and
in the extraction of the technical information, a difference between a time of occurrence of damage included in the technical information and the time of occurrence of damage included in the damage information is obtained, and technical information for which the obtained difference is within a set range is extracted.

13. The non-transitory computer-readable recording medium according to claim 11,
wherein, in the calculation of the similarity, a cosine similarity is calculated as the similarity using a word included in the damage information and a word included in the technical information corresponding to the damage information.

14. The non-transitory computer-readable recording medium according to claim 11,
wherein, in the calculation of the similarity, a word included in the damage information and a word included in the technical information corresponding to the damage information are input to a learning model trained through machine learning on similarity relation between a word indicating damage from a cyberattack and the word included in technical information, and the similarity is calculated based on an output result from the learning model.

15. The non-transitory computer-readable recording medium according to claim 11, the program further including instructions that cause the computer to:
extract damage information regarding damage from a cyberattack, from a news article,
wherein, in the extraction of the damage information, based on a result of diagnosis on a vulnerability that is present in a computer system, content of damage that is caused by a vulnerability indicated by the result of diagnosis is specified, and damage information that includes the specified content of damage is extracted from the news article.

* * * * *